United States Patent [19]
Presnick

[11] Patent Number: 5,417,323
[45] Date of Patent: May 23, 1995

[54] COMPACT DISK PACKAGE

[76] Inventor: Michael C. Presnick, 45 E. End Ave., New York, N.Y. 10028

[21] Appl. No.: 282,065

[22] Filed: Jul. 28, 1994

Related U.S. Application Data

[63] Continuation-in-part of Ser. No. 189,965, Feb. 1, 1994.

[51] Int. Cl.$^6$ ............................................. B65D 85/57
[52] U.S. Cl. ........................................ 206/309; 220/336
[58] Field of Search ............... 206/232, 303, 307–313, 206/387, 444; 220/336; 312/9.42

[56] References Cited

U.S. PATENT DOCUMENTS

| | | | |
|---|---|---|---|
| 4,054,344 | 10/1977 | Fujimoto et al. | 312/9.42 |
| 4,055,372 | 10/1977 | Tozawa et al. | 312/9.42 |
| 4,875,743 | 10/1989 | Gelardi et al. | 206/309 |
| 5,099,995 | 3/1992 | Karakane et al. | 206/309 |
| 5,150,354 | 9/1992 | Iwata et al. | 206/444 |
| 5,244,084 | 9/1993 | Chan | 206/309 |

FOREIGN PATENT DOCUMENTS

| | | | |
|---|---|---|---|
| 0007623 | of 1884 | United Kingdom | 220/336 |
| 2184426 | 6/1987 | United Kingdom | 206/444 |

*Primary Examiner*—Jimmy G. Foster
*Attorney, Agent, or Firm*—Schweitzer Cornman & Gross

[57] ABSTRACT

A container for displaying and storing a compact disk, comprising a square lower housing member having two upstanding side walls connected to a bottom wall and forming a first corner; a square upper housing member having a top wall with two depending side walls and forming a second corner; the upper and lower members being superimposed and arranged in a closed position to define a six-walled parallelpiped structure; said upper and said lower housing members having cooperating pivot means connecting them and allowing lateral rotating movement therebetween of approximately 90 degrees into an open position to permit insertion and removal of a compact disk; spring means associated with and extending between said upper and lower housing members to bias them into said open position; cooperating detent means associated with said upper and lower housing members to lock said members in said closed position; trigger means actuatable to unlock said detent means to permit lateral rotation of said upper housing member relative to said lower housing member under the biasing force of said spring means.

9 Claims, 5 Drawing Sheets

FIG. 6
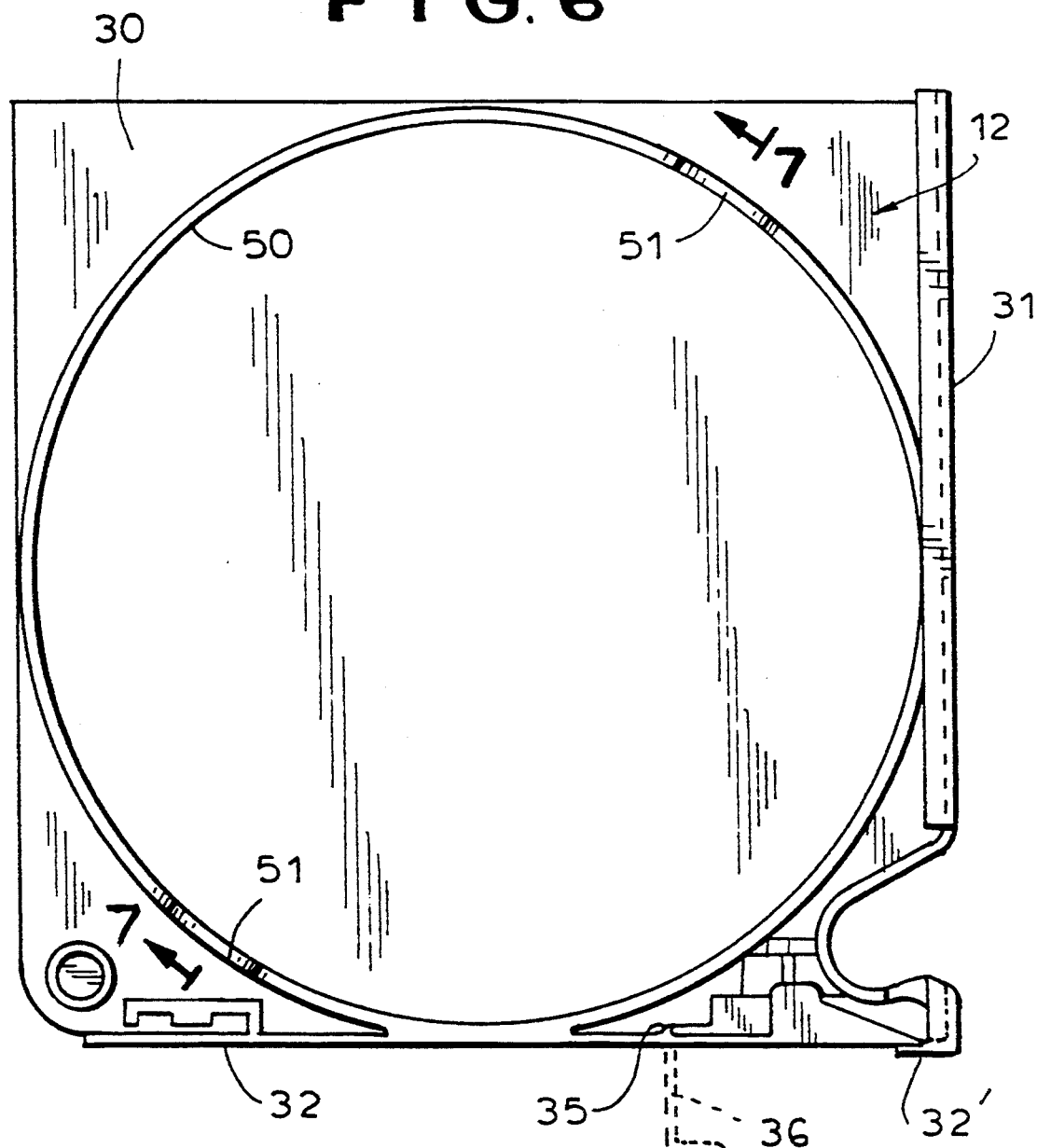
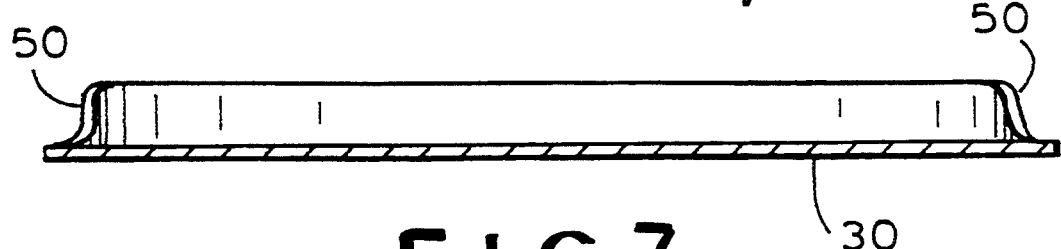
FIG. 7

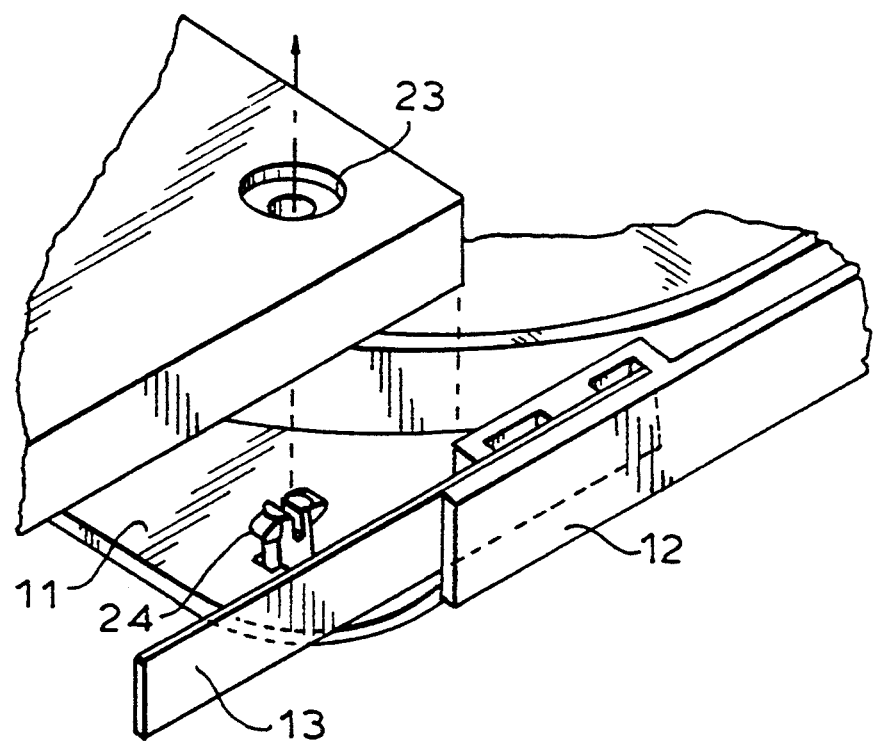
F I G. 10
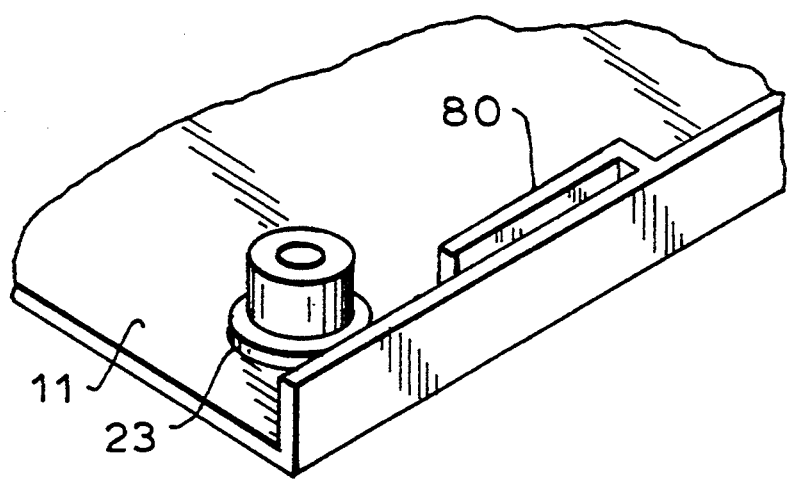
F I G. 11

COMPACT DISK PACKAGE

RELATION TO CO-PENDING APPLICATION

This application is a continuation-in-part of my earlier U.S. patent application Ser. No. 08/189,965 filed Feb. 1, 1994.

BACKGROUND OF THE INVENTION

1. Field and Background of the Invention

This invention generally relates to an improved six-walled package for a single compact disk (CD). These CD packages are known in the trade as "jewel boxes". They have been very difficult to open and expensive to manufacture. Users have often been confused as to where and how to open the packages.

Typical hinged "jewel boxes" are shown in U.S. Pat. Nos. 5,238,107; 5,253,751; 5,259,498; 5,205,405; 5,219,417; 5,211,283; 5,236,081; 5,249,677; 5,246,107; 5,244,084; 5,207,050; 5,263,580; 5,265,721; 5,205,401; 5,244,085;. In these boxes, the top cover hinged upwardly vertically away from the bottom tray to provide access to the disk. The hinges have caused problems in opening and have often failed in use.

The present invention relates to a device of the general character described which, in significant contrast, opens by the relative pivotal movement, horizontally through 90 degrees, of a unique three-walled upper element relative to a three-walled lower element. The new disk package may be opened with one hand.

2. Description of Prior Art Devices

The "jewel boxes" or CD packages of the prior art generally have a pivotably operable top cover, a bottom, and in between the top and bottom, a "rosette" for retaining the disk as well as graphic sheets or liner material descriptive of the disk. After assembly, a clear plastic wrapper is heat-shrunk or otherwise applied over the box. There are a great number of packages for CD's known and available to the trade, but these have met with a great deal of criticism. For example, the conventionally hinged prior art packages require too much dexterity to open with ease, and are difficult, and often impossible, to open with weak or arthritic hands. Also, the prior art hinges are difficult to manufacture and assemble, often resulting in fragile packages. In addition, there have been problems in removing the disk from the conventional plastic rosette that retains it within the box and there have been difficulties in removing and replacing the accompanying booklets or liner notes.

One proposed CD package (Inch Pack) eliminates the rosette and places a disk in a sliding drawer so that the disk may be removed without prying or flexing. When this CD package is opened, the booklet, which is in a separate tray, also slides out, extending far enough to be taken out easily. Obviously such a package is expensive to manufacture and is severely limited as to the manner in which it accommodates the graphics for the packaged disk. Another proposed CD package ("LASER-FILE") also uses a sliding drawer with a holder that bends downward when halfway out so that the disk can be gripped at the center hole and easily removed. The booklet slides forward through a thumbnail-shaped cutout, and can be pulled out easily. This package also is expensive to fabricate and is also limited as to how it accommodates the graphics for the disk.

There are several desiderata with CD packages. A container for a disk thus must make it possible to enable the consumer to inspect the disk and yet provide theft-resistance and physical protection for the disk when displayed. The CD package should not generate a large amount of waste packaging material to be discarded upon removal of the disk so as to not cause ecological problems; in other words, the package should be as small as possible. The package preferably should be reusable by the retailer for repackaging should a purchased container be returned for refund or exchange. Also it is desirable that the package be adaptable for use in pre-existing storage and display racks in both stores and homes. Of extreme importance in the economics of any successful CD package is that it be inexpensive to manufacture and that it not require expensive tooling. The package must be simple and inexpensive to print directly upon or to otherwise support product information on its face or to accommodate graphics for the packaged product. The product should be very easy to open, ideally with one hand; in other words, the product should be "user friendly".

Accordingly, the present invention is directed to an improved CD package, openable with one hand, which satisfies the foregoing criteria.

SUMMARY AND OBJECT OF THE INVENTION

A major objective of the present invention is to provide a package of the character described, with a minimum number of parts, which will overcome the shortcomings of known and currently commercially available packages.

Another objective of the present invention is to provide a new and improved, automatically opening CD package where the upper and lower components are pivotally connected by a single pivot and spring biased to accommodate opening movement through approximately 90 degrees in a common horizontal plane so as to facilitate removal and replacement of the disk when the components are unlocked by a trigger mechanism.

A further objective of the invention is to provide efficient and economical packaging for a single CD which lends itself to large scale production from available plastic materials and which packaging will accommodate the application thereto or the incorporation therein of printed graphic material of the type associated with compact disks.

For a more complete understanding of the invention and its attendant advantages, reference should be made to the following detailed description taken in conjunction with the accompanying drawings.

BRIEF DESCRIPTION OF THE DRAWINGS

FIG. 6 is a schematic top plan view of the bottom housing member showing the trigger mechanism bent backward for purposes of manufacture of the living hinge;

FIG. 7 is a cross-sectional view taken along line 7—7 of FIG. 6;

FIG. 10 is a schematic perspective view showing the manner of assembling the top housing member to the bottom housing member by the pivot connection; and FIG. 11 is a schematic perspective view of the underside of the cover element showing the female socket for receiving the male pivot member.

DETAILED DESCRIPTION OF THE PRESENT INVENTION

Figure 1:
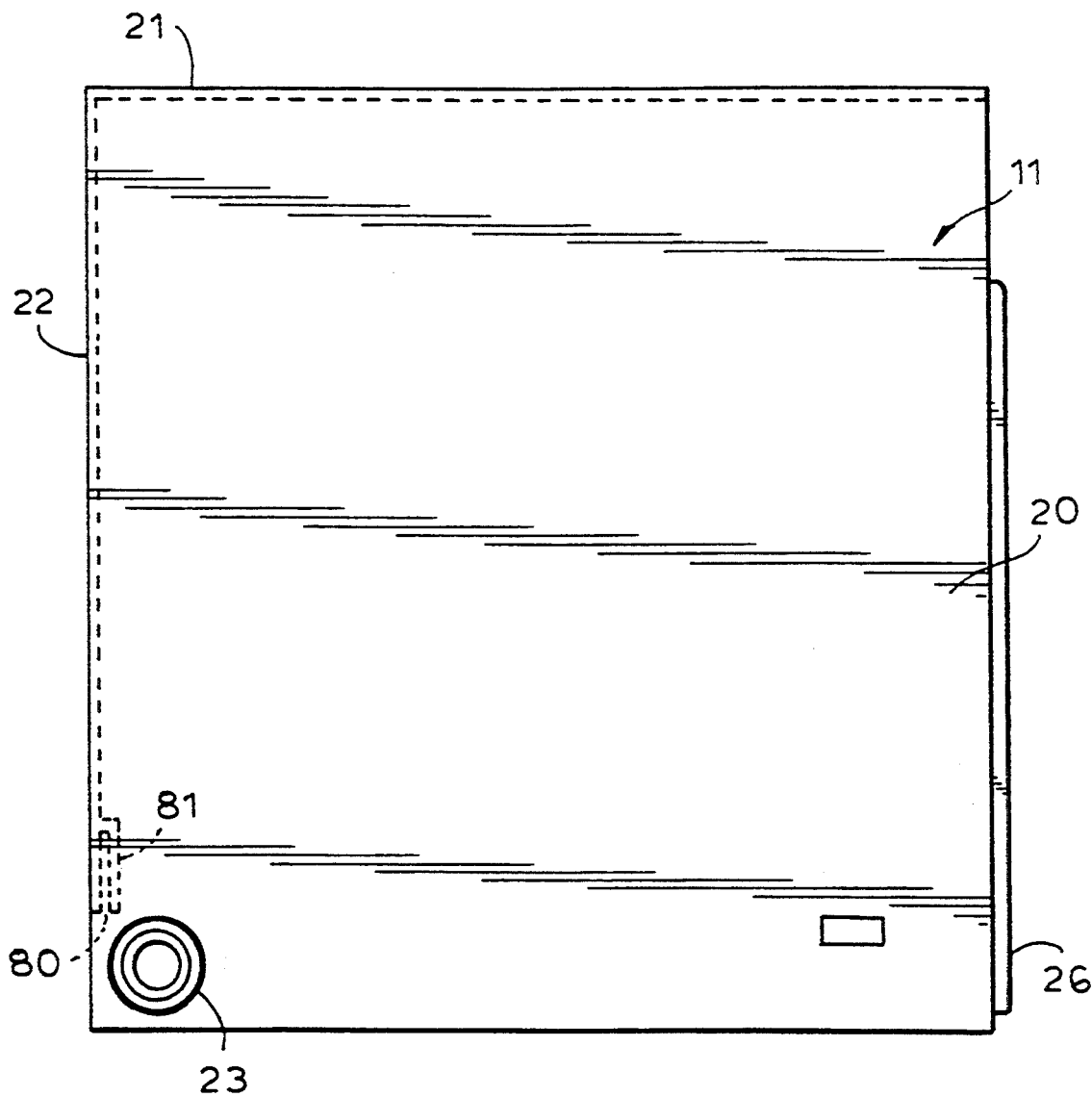
FIG. 1 is a top plan view of the cover or top housing member for the improved CD package of the present invention.
Figure 3:
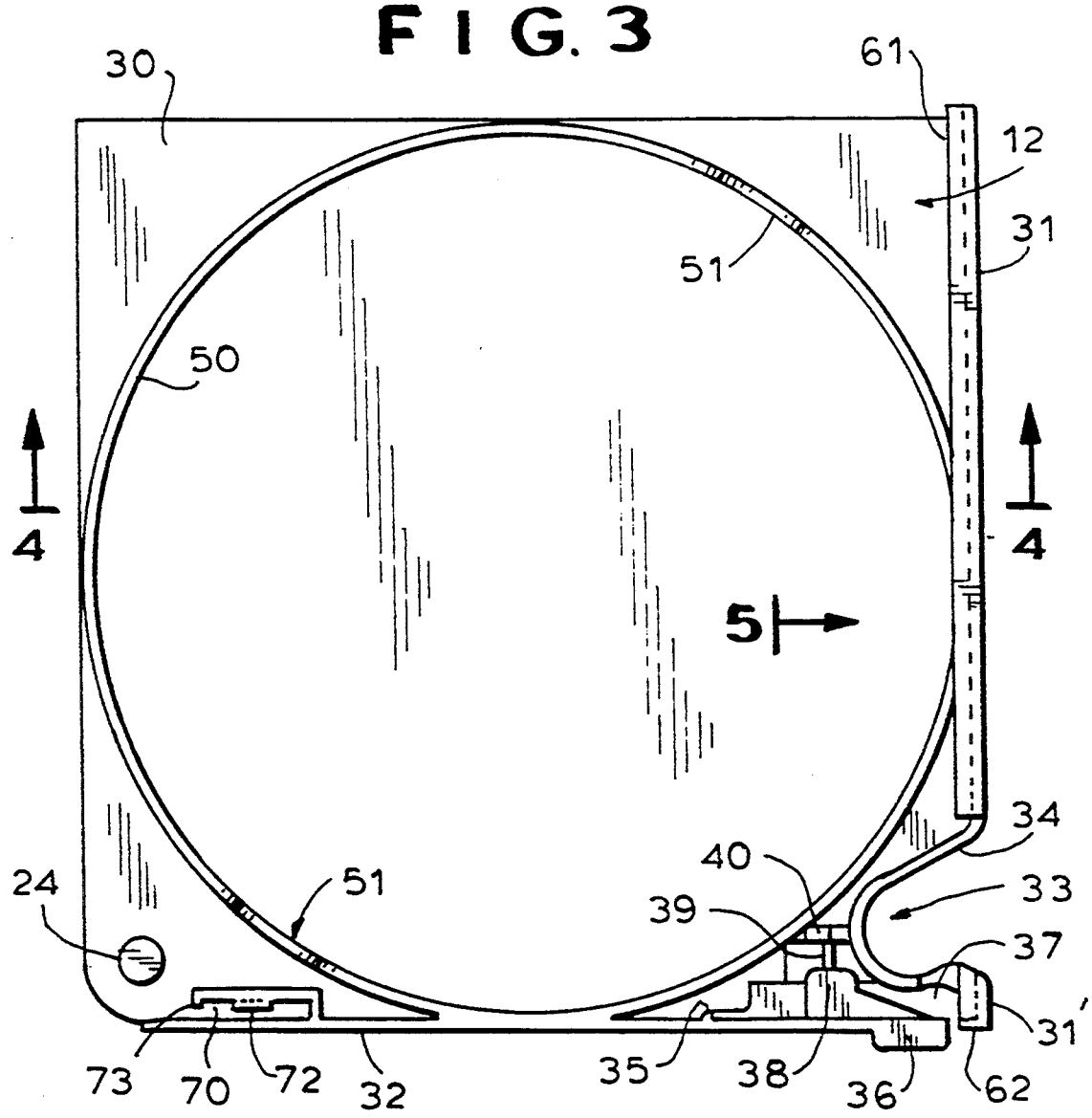
FIG. 3 is top plan view of the base or bottom housing member of the improved CD package.
Figure 4:
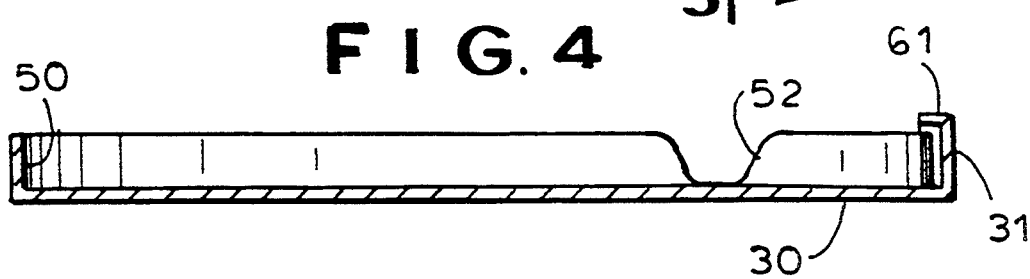
FIG. 4 is a cross-sectional view taken along line 4—4 of FIG. 3.
Figure 5:
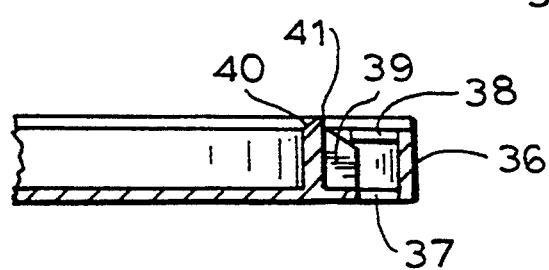
FIG. 5 is a fragmentary cross-sectional view taken along line 5—5 of FIG. 3 showing details of the detent locking mechanism of the present invention.
Figure 8:
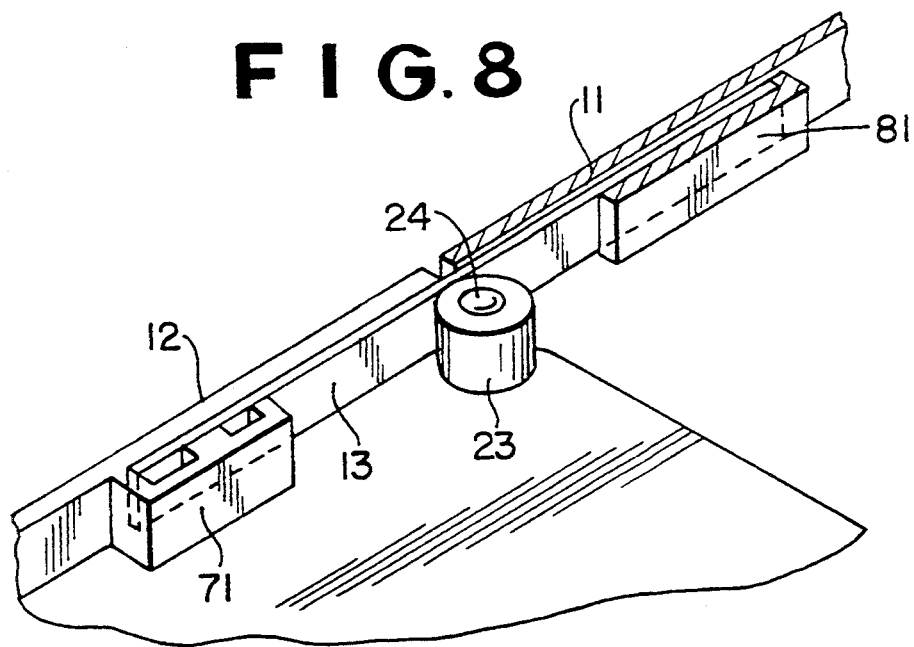
FIG. 8 is an enlarged perspective schematic view showing the spring biasing assembly of the present invention with the new package open.
Figure 9:
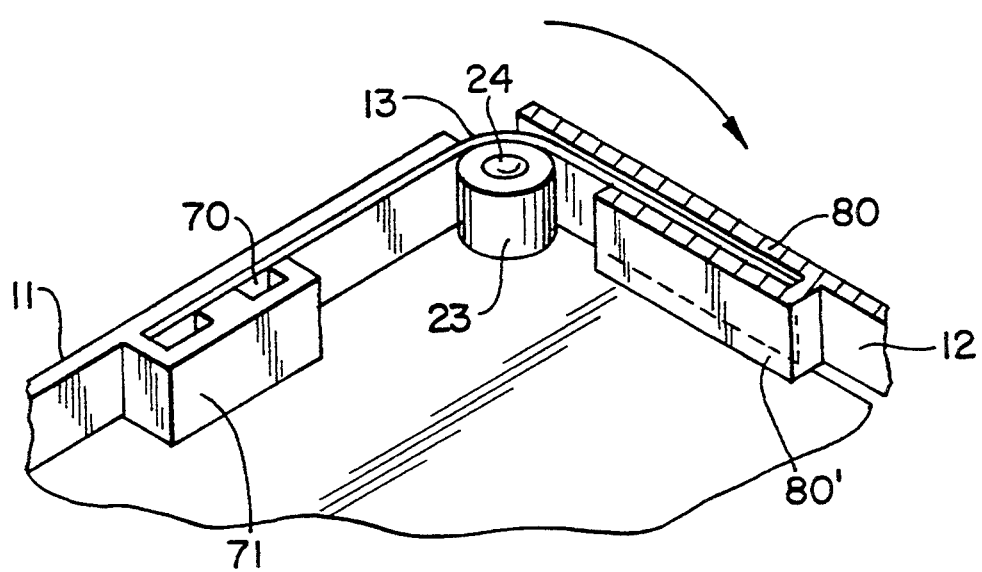
FIG. 9 is a schematic perspective of the spring assembly with the box cover being rotated into a partially closed position.

The new and improved compact disk package of the present invention comprises a bare minimum of parts, namely a cover or top housing member 11 which is shown in FIG. 1, a bottom housing member 12 which is shown in FIG. 3, and a biasing spring member 13 which extends between the bottom 11 and the cover 12 as shown in FIGS. 8 and 9. The top 11 is connected to the base 12 by a pivoting, locking interconnection in a manner generally disclosed in earlier co-pending application Ser. No. 189,965, the details of which are incorporated herein by reference.

Figure 2:
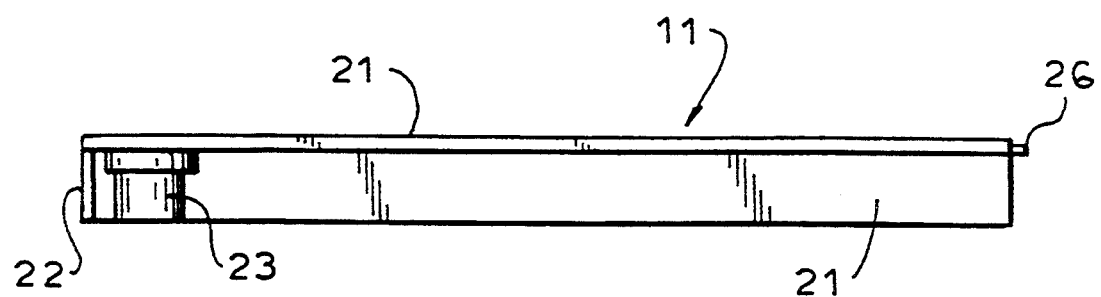
FIG. 2 is a side elevational view of the cover shown in FIG. 1.

More specifically, the housing cover member shown in FIG. 1 includes a planar top wall 20 with depending side walls 21 and 22 extending perpendicularly downwardly as shown in FIG. 2. Also depending downwardly from the top wall 20 and formed integrally therewith is a female socket member 23 which is configured to accept and receive a pivoting mating male bayonet or "click-lock" pivot 24 when the top is assembled to a mating bottom as will be described in greater detail hereinafter. A locking slot 25 is formed in the top wall 20 to receive a mating locking detent formed in the bottom to hold the top and bottom elements locked together when the unit is closed. Also included in the housing cover element is a laterally extending narrow stabilizing flange 26 which projects outwardly from the edge of the top wall 20 as shown. A spring slot 80 is formed adjacent the socket 23 by an L-shaped member 81.

The bottom housing member 12, which is formed from a single injection molded element, as is the top housing member 11, includes a base wall 30 from which two perpendicular side walls 31 and 32 project upwardly. In accordance with the principles of the invention, the side wall 31 does not extend for the full length of the box; rather, it terminates at a recessed portion or index finger notch 33 which is defined by a finger wall 34 which connects at one end to the wall 31 and at the other end to a wall segment 31' which is colinear with the wall 31.

The wall 32 does not extend for the full width of the bottom member 12; rather, it is connected by a notch or "living hinge" 35 to a trigger 36. There is a recess or cutout 37 formed in the bottom wall 30 which accommodates the inward flexing of the trigger 36 to engage the underside of the cover 11 to unlock the cover from the base in accordance with the invention. The present design places the index finger and thumb in a position to oppose each other, at a convenient location utilizing the corner of the box which does not have a function. Thus the location of notch 33 and trigger 36 is ideally in the bottom corner.

The hinged trigger 36 is formed integrally with the bottom 12 is injection molded, as shown in phantom in FIG. 6, generally perpendicularly to the wall 32. The length of the trigger 36 from the hinge 35 to its distal free edge is sufficient to reach the wall portion 31'. A short side wall portion 32' in the form of a lip is formed colinearly with wall 32. After molding the hinge 36 is pressed inwardly and beyond the lip. It will be retained within the rectangular periphery of the bottom 12 by engagement with the lip 32'. Thus the trigger 36 will be inwardly depressible to unlock the detent, but its outward travel will be limited.

Adjacent the inward portion 38 of the trigger 36 is a camming ramp 39. Adjacent the uppermost portion of the ramp 39 is a detent member 40 which is a post configured with a locking tip 41 to engage the locking slot 24 of the cover and to retain the cover in a locked position.

Also formed integrally with the cover is a circular wall 50 which is slightly larger than the diameter of the compact disk which is to be housed in the new package. The wall 50 is interrupted in two more locations to provide finger notches to enable a user to grasp the outer edges of a CD to remove it from the package. These finger notches 51 are shown in cross section in FIG. 7. The side wall 31 and side wall portion 31' include flanges 61, 62 which project horizontally toward the center of the unit. The upper edges of the circular wall 50 are spaced slightly below the bottom edges of the flange 61 to form a groove into which the flange 26 may be received to stabilize and hold the top cover 12 to the bottom assembly when the top and bottom are in a closed position.

Finally, the bottom 12 includes an upwardly projecting bayonet male pivot pin 24 which is adapted to snap or "click-lock" into the mating socket 23 to join the bottom housing member to the cover housing member to form a complete CD package. A spring retaining slot 70 is formed adjacent the pin 21 by an L-shaped arm member 71. As will be understood and in accordance with the invention, one end of the biasing spring 13 is seated in the opening 70 and retained therein by the arm 71 and its projecting friction members 72, 73.

The underside of the cover 12 has a similar spring receiving slot 80 formed thereon by an L-shaped wall member 81 which functions in the manner of the wall member 71 to retain the free end of the biasing spring 13 (advantageously, a flat steel spring). This is best shown in FIGS. 8 and 9, which is a schematic illustration showing the spring 13, a straight flat spring extending between the spring retaining slots 70 and 80 and being bendable about the pivot socket 23 when the housing is assembled to the base by the insertion of the male bayonet pivot 24 into the female socket as illustrated schematically in FIG. 10. Thus, it will be appreciated that the top member and the bottom member may be assembled by unskilled labor or by a simple machine simply by juxtaposing the top member over the bottom member with the spring 13 inserted in place in the slot 70. This will result in the free end of the spring being engaged in the slot 80 of the cover member when the cover is assembled to the base by the snap locking connection of the male member 24 to the socket member 23. Thereafter, the top may be rotated 90 degrees against the force of the spring as shown in FIG. 9 into a position in which the detent locking tip 41 engages the locking slot 25 in the cover to hold the cover 11 in a closed position with the base 12 in which the depending side walls 21, 22 of the cover cooperate with the upstanding side walls 31, 32 of the bottom to form a closed six-sided parallelpiped package generally of similar shape to that heretofore employed in the art.

In accordance with the principles of the invention, the thus-assembled and locked package may be unlocked by depressing the trigger 36 inwardly to cause the inner unlocking portion 38 of the trigger to ride up the ramp 39, thereby slightly lifting the top cover wall 20 to thereby disengage the locking slot 25 from the detent 40. At this stage, the spring bias will tend to straighten out the spring 13 to rotate the cover into an opening position in accordance with the inventive principles. When the cover is open, the CD may be easily inserted or removed therefrom.

It will be understood that in the mass production of the new and improved CD package, the CD to be packaged may be placed within the confines of the walls 50 before the cover is attached to the base, although the new boxes may be pre-assembled before being loaded with disks.

As a very special advantage of the construction of the new CD unit, the unit may be opened with only one hand simply by placing the index finger into the finger slot 33 and pushing the trigger 36 with the thumb. This is an especially advantageous feature where CD packages are being opened by persons who are engaged in an activity where one hand is otherwise occupied.

It will be appreciated that the CD package described hereinabove describes a new and improved package which may be manufactured at extremely low cost while providing many benefits not heretofore available in the art. The new unit requires only three parts, an injection molded cover, an injection molded base, and a simple spring. It lends itself to easy opening, indeed it allows one-handed operation. The new unit also lends itself to simple manufacture and assembly.

It is to be understood that variations in the shape, size and arrangement of the elements of this inventions as claimed hereinbelow may be desired or necessary in the actual practice of the invention. For example, the arrangement of the male and female pivot members may be interchanged as well as the arrangement of certain of the wall elements. Similarly, any number of locking detent arrangements may be employed in lieu of the specific detent arrangement shown and described, and the type and arrangement of the trigger may similarly be varied as deemed necessary. Accordingly, departures may be made from such details without departing from the spirit or scope of the general inventive concept that is defined by the appended claims and their equivalents.

I claim:

1. A container for displaying and storing a compact disk, comprising:
   (a) a square lower housing member having two upstanding side walls connected to a bottom wall and forming a first corner;
   (b) a square upper housing member having a top wall with two depending side walls and forming a second corner;
   (c) the upper and lower members being superimposed and arranged in a closed position to define a six-walled parallelpiped structure;
   (d) said upper and said lower housing members having cooperating pivot means connecting them and allowing lateral rotating movement therebetween of approximately 90 degrees into an open position to permit insertion and removal of a compact disk;
   (e) spring means associated with and extending between said upper and lower housing members to bias them into said open position;
   (f) cooperating detent means associated with said upper and lower housing members to lock said members in said closed position;
   (g) trigger means actuatable to unlock said detent means to permit lateral rotation of said upper housing member relative to said lower housing member under the biasing force of said spring means.

2. The container of claim 1, in which
   (a) said detent means includes a post projecting upwardly from said bottom housing member;
   (b) said post having a locking tip;
   (c) said cover includes a locking slot adapted to receive said locking tip;
   (d) a camming ramp means is formed adjacent said trigger;
   (e) said trigger includes an inner portion engaging said cover;
   (f) said trigger being depressible into contact with said camming ramp to engage said cover to lift said slot out of locking engagement with said locking tip;
   (g) whereby said cover will spring into its open position under the bias of said spring means.

3. The container of claim 1, in which
   (a) said spring means is a flat spring.

4. The container of claim 1, in which
   (a) an inwardly projecting finger notch is formed in said bottom housing member in one of said walls for facilitating grasping the container during opening.

5. The container of claim 1, in which
   (a) said trigger is formed in said bottom housing member in one of said walls for facilitating grasping the container during opening.

6. The container of claim 5, in which
   (a) said trigger is incorporated into said housing member by a living hinge.

7. The container of claim 1, in which
   (a) a male pivot pin is formed on one of said housing members;
   (b) a female socket is formed on the other of said housing members;
   (c) said pivot pin is adapted to click-lock with said socket.

8. The container of claim 7, in which
   (a) said spring means is a flat spring;
   (b) said housing members include spring receiving slot means therein adjacent said pivot pin and said socket.

9. The container of claim 7, in which
   (a) an inwardly projecting finger notch is formed in said bottom housing member in one of said walls for facilitating grasping the container during opening;
   (b) said trigger is formed in said bottom housing member in one of said walls for facilitating grasping the container during opening.

* * * * *